United States Patent [19]

Reitz

[11] 4,338,858

[45] Jul. 13, 1982

[54] INTERNAL COMBUSTION ENGINE PISTON

[75] Inventor: Johannes Reitz, Heilbronn-Kirschhausen, Fed. Rep. of Germany

[73] Assignee: Metallgesellschaft AG, Frankfurt am Main, Fed. Rep. of Germany

[21] Appl. No.: 948,183

[22] Filed: Oct. 2, 1978

Related U.S. Application Data

[63] Continuation-in-part of Ser. No. 771,123, Feb. 22, 1977, abandoned, which is a continuation-in-part of Ser. No. 583,492, Jun. 3, 1975, abandoned.

[30] Foreign Application Priority Data

Jun. 27, 1974 [DE] Fed. Rep. of Germany ........ 2430829

[51] Int. Cl.$^3$ ............................ F02F 3/00; F16J 1/14

[52] U.S. Cl. ........................................ 92/222; 92/238; 92/239; 123/193 P

[58] Field of Search ................. 92/222, 238, 239, 237; 123/193 P

[56] References Cited

U.S. PATENT DOCUMENTS

| | | | |
|---|---|---|---|
| 1,283,021 | 10/1918 | Anderson | 92/237 |
| 2,035,692 | 3/1936 | Dietrich | 92/238 X |
| 2,128,451 | 8/1938 | Burton | 92/238 X |
| 2,190,207 | 4/1940 | Dillon | 92/238 X |
| 2,262,132 | 11/1941 | Barry | 92/239 |

FOREIGN PATENT DOCUMENTS

| | | | |
|---|---|---|---|
| 19238 | of 1929 | Australia | 92/237 |
| 708646 | 7/1941 | Fed. Rep. of Germany | 92/238 |
| 471466 | 9/1937 | United Kingdom | 92/239 |

*Primary Examiner*—Irwin C. Cohen

*Attorney, Agent, or Firm*—Sprung, Horn, Kramer & Woods

[57] ABSTRACT

A piston for internal combustion engines, preferably made of aluminum or its alloys, having freely suspended piston pin bosses connected by first ribs to the piston head at points of zero moment and by second ribs to the piston skirt. The piston skirt has apertures in register with the bores in the piston pin bosses. The piston head is separated from the piston skirt by a transverse slot through at least a part of the circumference of the piston head and the ribs which connect the piston pin bosses to the piston skirt extend at an angle of 0°–45° to the boss plane.

1 Claim, 8 Drawing Figures

INTERNAL COMBUSTION ENGINE PISTON

This is a continuation in part of application Ser. No. 771,123, filed Feb. 22, 1977, now abandoned, which is a continuation-in-part of application Ser. No. 583,492, filed June 3, 1975, now abandoned.

BACKGROUND

This invention relates to a piston for internal combustion engines preferably made of aluminum or its alloys and in which the freely suspended piston pin bosses are connected by respective ribs to the piston head and the piston skirt and the piston skirt is formed with apertures in register with the bores in the piston pin bosses.

Otto-cycle and Diesel type engines in which one-metal pistons made preferably of aluminum or its alloys, must meet particularly high requirements as regards silent running, oil consumption, seizure-proofness, groove wear and general adaptability to greatly changing operating conditions, and particularly as regards the straight-line motion of the piston. It is conventional to use so-called controlled-expansion pistons for such engines.

In the broadest sense, the term controlled-expansion pistons is applicable to pistons which embody special structural features that ensure that the thermal expansion in a radial direction takes place preferentially only in the direction of the boss axis or in which the carrying skirt portions are designed so that they can elastically yield to take up a thermal expansion in a radial direction.

In a narrow sense the term is applicable to pistons which comprise expansion-resisting control members of steel that are embedded in the piston casting at suitable locations, in most cases in the skirt, and prevent an excessively large expansion of the light metal at operating temperature. This expansion is particularly undesired at right angles to the boss axes. These expansion control members divert said expansion in the direction of the boss axis and ensure that the clearance of the piston in the pressure and back-pressure directions is adapted to the cylinder diameter under all operating conditions as far as possible. In this way the nominal clearance of the piston, measured in its direction of movement, may be held almost constant throughout the range of operating conditions although the cylinder expands to a larger diameter at elevated temperature. The expansion control action is equivalent to the coefficient of the thermal expansion of the piston and is determined by the temperature gradient between the piston head and the skirt. This gradient is different for each engine and is affected by design features.

The coaction of the clearance of the piston, the expansion control action and the deformation of the skirt is decisive for the straight-line motion of the piston. It must always be borne in mind that a compromise must be found between the requirements for an adequate stiffness, stress concentration factor and expansion control action. Only with such compromise will the requirements as regards silent running and seizure-proofness be fulfilled.

The operating temperature results in a mean coefficient of the thermal expansion, which lies between the coefficients of thermal expansion of the light alloy and steel, depending on the ratio of the wall thicknesses. In view of the temperature gradient between the piston head and skirt, this mean coefficient of thermal expansion results in an increase of the differential deformation over that which is due to the temperature difference so that the action of the piston head to deform the skirt to an oval shape is increased further. Because the circumference of the skirt is substantially constant, the diameter is increased in the direction of the pins and is decreased in the pressure and back-pressure directions.

Because the expansion of the light metal is not entirely prevented, the ovality of the skirt must be larger than normal. Almost all controlled-expansion pistons exhibit a more or less pronounced separation between the piston head and skirt. For instance, the expansion control action is greatly promoted by separating slots, which lie preferably in the oil scraper ring groove. Pistons which have steel inserts but lack an appreciable separation between the head and skirt exhibit only a small expansion control action.

The known types of controlled-expansion pistons (German Pat. No. 909,163, Printed German Application No. 1,078,387, German patent specification No. 1,245,657), have an expansion control action of $15\text{–}20\times10^{-6}$ mm/mm°C. at the upper rim of the skirt and of $18\text{–}22\times10^{-6}$ mm/mm°C. at the lower rim of the skirt and are restricted in application to specific ranges as regards horsepower per unit of displacement and as regards piston diameter.

In a sense, so-called slotted-skirt pistons are also controlled-expansion pistons. These pistons, which lack cast-in expansion control members of steel, were mainly used in the forties and are still used today in some cases. A feature resides in that the skirt is separated from the hot piston head by two slots in or under the lower-most groove and one or more longitudinal slots are provided in the skirt at suitable locations.

The transverse slots provide for a certain expansion control action and the longitudinal slots impart a high elasticity to the skirt. The increase of the light metal in diameter during operation is taken up by the elastic deformation of the skirt. Because the skirt is yieldable and adaptable, slotted-skirt pistons are highly seizure-proof. On the other hand, they have the serious disadvantage that they lack a sufficiently high creep strength of the light metal at elevated temperatures and at the high frequency of load reversals which is due to higher engine speeds and that permanent deformations, resulting in a higher noise, possibly in seizure and in an incipient and complete fracture of the skirt must be expected after a prolonged operating time.

SUMMARY

This invention improves the pistons described above in which the piston pin bosses are freely suspended and are connected each to the piston head by a rib which extends parallel to the pressure-back-pressure plane from a point of zero moment or an inflection point and are connected each to the piston skirt by two ribs, and provides a controlled-expansion piston which is free of cast-in expansion control members of steel and is suitable for all ranges of application and which in conjunction with a skirt of normal ovality ensures an expansion control action which meets all requirements during the operation of the engine, since the ribs extending from the piston head are only loaded by stress and pressure and not by bending. Therefore a rib connection between these ribs and the inner side of the ring field is unnecessary.

This is further accomplished by a piston head separated from the piston skirt by a transverse slot throughout at least a part of its circumference and ribs which connect the piston pin bosses to the piston skirt extending at an angle $\theta$ of 0°–45°, preferably 0° to smaller than 45°, to the boss plane. It has been found that an optimum expansion control action can be achieved if the ribs which connect the piston pin bosses to the piston skirt extend at an angle of 30°–45° to the boss plane.

According to a preferred embodiment the piston head is separated from the piston skirt around a circumferential arc of 70°–110° on the pressure and backpressure sides.

The transverse slot separates the piston skirt from the piston head throughout the circumference or a part thereof and inhibits the flow of heat. This results in a substantial reduction of the temperature of the piston skirt so that its expansion is reduced too. The piston skirt is now connected to the piston head only by the ribs and piston pin bosses. The piston head is at a high temperature relative to the upper end of the skirt because there are no steel inserts in this area which would inhibit the flow of heat. This high temperature results in a relatively large expansion, which is transmitted to the skirt in the direction of the boss axis only by the ribs and the piston pin bosses. As a result, the upper portion of the piston skirt expands in the direction of the boss axis and is decreased in diameter at right angles thereto as the circumference of the skirt is virtually constant. This control action exactly meets the requirement that the control action in the hotter top portion of the skirt should be larger than in the colder bottom portion of the skirt. Because the factors which determine the expansion control action, such as the length of the transverse slot, the direction of the skirt-supporting means, the cross-sections of the heat flow paths, the means supporting the piston head and the means supporting the skirt, can be varied in wider ranges, the control action can be more properly matched to the cylinder diameter.

As a result of this expansion control action at normal ovality and convexity it is ensured that the actual expansion of the piston skirt is approximately the same as that of the cylinder under all operating conditions of the engine, whether the cylinder consists of cast iron or aluminum. This matching permits of any positive and negative expansion control action so that the field of application of the piston does not depend on the relationship between the power of the engine per unit of displacement and the piston diameter, as is the case with conventional controlled-expansion pistons.

The measures according to the invention result also in a smooth running of the controlled-expansion piston, in a lower oil consumption and an optimum stress distribution pattern. With a given running clearance, the ovality of the piston skirt need not be so large as with conventional controlled-expansion pistons. The initial stress of the piston at the operating temperature is lower so that the frictional loss is reduced too.

The controlled expansion piston may be lighter in weight by up to 25% than a conventional controlled-expansion piston.

BRIEF DESCRIPTION OF THE DRAWINGS

The controlled-expansion piston according to the invention is shown by way of example on the drawing and will be explained more fully hereinafter.

DETAILED DESCRIPTION OF THE INVENTION

Figure 1:
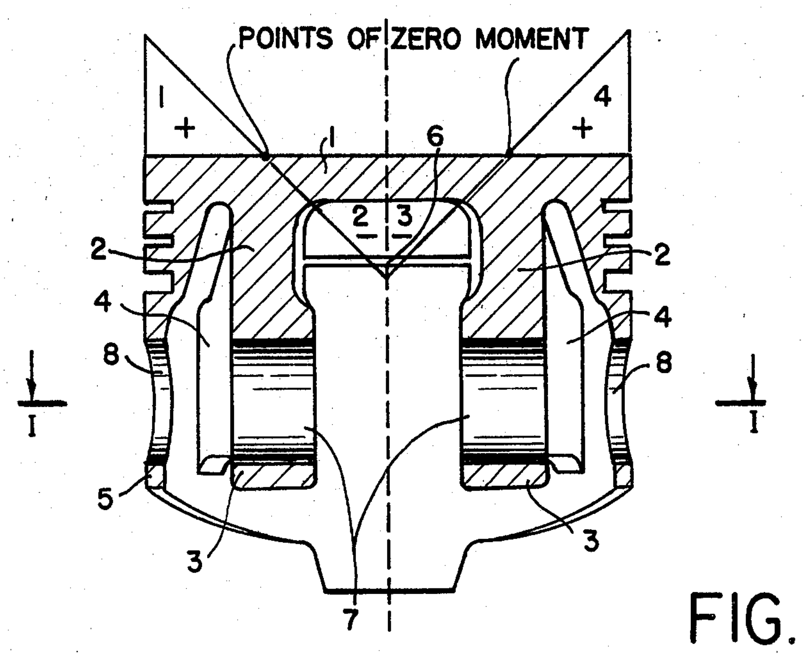
FIG. 1 is a longitudinal sectional view taken through a controlled-expansion piston on the boss plane.
Figure 2:
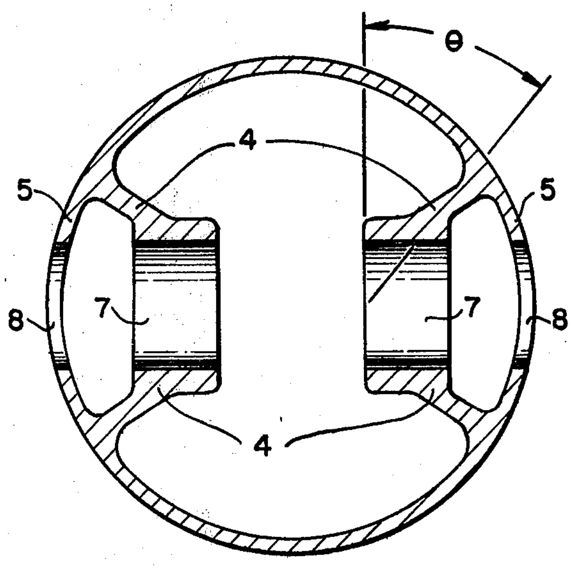
FIG. 2 is a transverse sectional view taken on line I—I in FIG. 1.

As shown in FIG. 1, piston pin bosses 3 are freely suspended from piston head 1 by ribs 2. To ensure an expansion control action according to the invention, the bosses 3 are connected to a skirt 5 of the piston by ribs 4, which extend at an angle of 30°. In the pressure and backpressure regions, the piston is formed with a transverse slot 6 between the piston head 1 and the piston skirt 5. This slot extends around a circumferential arc of 110°. The piston skirt 5 is formed with apertures 8 in register with the bores 7 in the piston pin bosses. 1 This controlled-expansion piston exhibits an expansion of $14\times10^{-6}$ mm/mm°C. adjacent to the upper rim of the skirt and of $17\times10^{-6}$ mm/mm°C. at the lower rim of the skirt.

The ribs 2 extend downwardly from the underside of the head and are disposed at the points of zero moment or inflection points.

Figure 6:
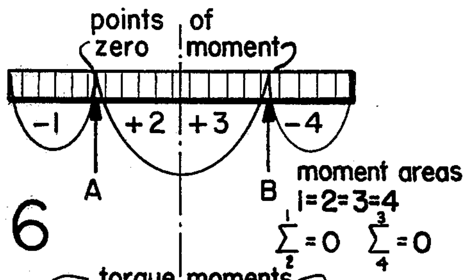
FIG. 6 is a force diagram of the piston head of FIG. 5.

As can be seen from FIG. 6 each rib 2 has only one point of zero moment at the surface of the piston head. Independently of the adjustment of these ribs at the points of zero moment the connection ribs 4 between the pin bosses and the piston skirt lie between the value of 0° and 45°, and preferably 30° to 45°. The latter ribs 4 are for the support and the expansion control of the piston skirt.

Figure 3:
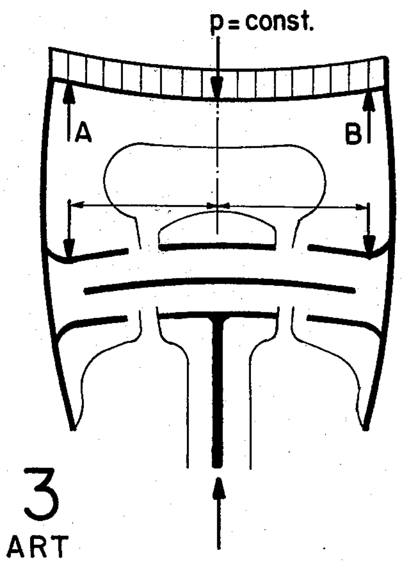
FIG. 3 PRIOR ART
FIG. 3 is a stress diagram of a prior art piston head.
Figure 5:
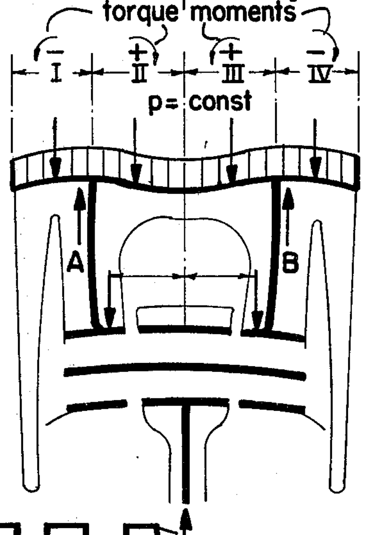
FIG. 5 is a stress diagram of the piston head of FIG. 1.
Figure 4:
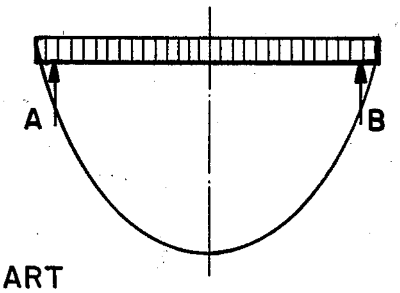
PRIOR ART FIG. 4
FIG. 4 is a force diagram of piston head of FIG. 3.

Because the piston head is loaded by the pressure of the combustion gases therefore the piston head of a prior art piston may approximately be considered a supporting beam as shown in FIG. 4, and the piston head of the piston of the present invention may approximately be considered a cantilever beam as shown in FIG. 5. In both cases the load is constantly distributed over the length of the beams. During the engine running, the piston heads are deformed by the pressure of the combustion gases as shown scaled up in FIG. 3 and FIG. 5. Consequently, in the deformation of the prior art piston head appropriate of FIG. 3, the skirt is spherically deformed. To avoid such a deformation of the skirt it is necessary to connect the piston pin bosses to the piston head and skirt by thick-walled ribs.

Compared with this the skirt of the piston of the present invention shown in FIG. 5 is not deformed because the ribs are arranged at the points of zero-moment. The supporting cross-section of the ribs is loaded only by pressure and strength and not by bending. Because the moment zones I, II, III, IV are only stressed by bending, no deformation by pressure and strength takes place. This means that the zones I, II, III, IV are free of tension and therefore a connection between the ring field and the ribs by additional ribs is unnecessary.

Figure 8:
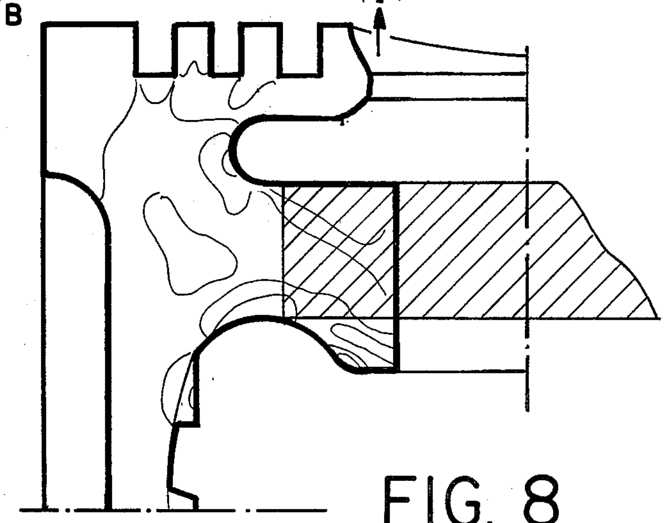
FIG. 8 is a stress analysis of the piston according to FIG. 1.
Figure 7:
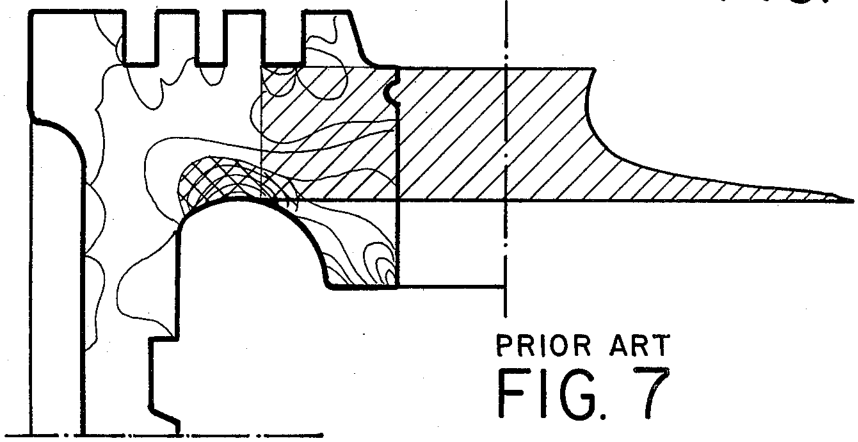
PRIOR ART FIG. 7
FIG. 7 is a stress analysis of a prior art piston.

FIGS. 7 and 8 are two photoelastic pictures and their stress analysis. FIG. 7 shows the ring field of a prior art piston at which the rib is connected with the back of the ring field. The photoelastic portrayal shows a high stress concentration in the cross hatched area causing a high stress peak at the inner side of the rib as it can be seen from the shaded area.

According to FIG. 8 which shows the present invention, the ribs of the freely suspended pin bosses are supported on the piston head at the points of zero moment but without a connection to the back of the ring field. As a result, the photoelastic picture shows an important stress fall at the rib as can be seen from the shaded area.

It will be appreciated that the instant specification and claims are set forth by way of illustration and not limitation, and that various modifications and changes may be made without departing from the spirit and scope of the present invention.

What is claimed is:

1. In a piston for an internal combustion engine, the piston comprising aluminum or an aluminum alloy, and having a head, a skirt depending from the head and two pin bosses extending downwardly from the underside of the head, the piston being provided with a horizontal transverse slot throughout a circumferential arc of 70°–110° between the head and skirt, the extending end portions of the bosses being provided with substantially planar and parallel inner and outer faces having aligned throughbores receptive of a piston pin and the skirt being provided with apertures in registry with said bores, the improvement which comprises having each of said bosses joined by one first rib to the underside of the piston head and by a pair of second ribs extending outwardly and diverging from adjacent to its outer face to the inner side of the piston skirt, the second ribs of each pair extending at an angle of 30°–45° to the plane of the inner face of the respective boss, and each first rib is disposed at the point of zero moment on the piston head.

* * * * *

UNITED STATES PATENT AND TRADEMARK OFFICE
CERTIFICATE OF CORRECTION

PATENT NO. : 4,338,858
DATED : July 13, 1982
INVENTOR(S) : Johannes Reitz

It is certified that error appears in the above—identified patent and that said Letters Patent is hereby corrected as shown below:

On the title page, Item [56]
Under "U.S. Patent Documents" Delete "Barry" and insert --Berry- Under "Foreign Pat. Documents" After "19238" delete "of" and insert--9/--

Signed and Sealed this

*Sixteenth* Day of *November 1982*

[SEAL]

*Attest:*

GERALD J. MOSSINGHOFF

*Attesting Officer* *Commissioner of Patents and Trademarks*